United States Patent Office 2,847,398
Patented Aug. 12, 1958

2,847,398

VINYLENE CARBONATE-ETHYLENE COPOLYMER AND METHOD OF PRODUCING SAME

Earl W. Gluesenkamp and John D. Calfee, Dayton, Ohio, assignors to Monsanto Chemical Company, St. Louis, Mo., a corporation of Delaware No Drawing. Application May 18, 1953
Serial No. 355,859

5 Claims. (Cl. 260—77.5)

This invention relates to new copolymers and to methods of making same. In one of its aspects the invention pertains to an improved polyethylene-type material. In another aspect the invention pertains to a method of polymerization.

It has long been known to subject ethylene to polymerization at high pressures of the order of at least 5,000 pounds and often up to 40,000 or 50,000 pounds per square inch, with or without the use of small amounts of oxygen or organic peroxide catalysts, thereby producing a normally solid waxy polymer of high molecular weight, ranging from 6,000 up to 20,000 or 40,000 and higher and apparently showing the presence of crystalline material by X-ray diffraction analysis. Material prepared in this manner and having these general properties is now commonly termed "polyethylene" and is a very important product in the plastics industry.

The production of a polyethylene having sufficiently good physical properties to make it a saleable commercial product is not easy. Molecular weight, the presence or absence of cross-linking and branching, the stability of the product towards oxidation and other degradation, the processibility, are all sensitive to fairly minor variations in reaction conditions. Even the best commercial polyethylene leave something to be desired in their physical properties. It would be of great practical importance to find a simple means of improving such properties, and particularly of permitting the production of commercial grade polyethylene under reaction conditions which do not ordinarily give a satisfactory commercial product.

In many applications the appearance of polyethylene is of little or no importance. However, its cloudiness and lack of surface gloss are severe drawbacks to the commercial utilization of polyethylene where the aesthetic appeal of the product is important, or where lack of clarity decreases the practical value of the product. Heretofore, satisfactory methods have not been known for making comparatively clear polyethylene or polyethylene having a good surface gloss.

An object of this invention is to provide new copolymers. Another object of the invention is to provide improved polyethylene-like materials. A further object is to provide a comonomer for ethylene which, when used along with the ethylene during high pressure polymerization, greatly improves the physical properties of the resulting normally solid polymers. Another object is to provide a new polymerization process. Still another object is to produce a polyethylene-like material having a low elastic memory. Another object is to provide a polyethylene-like material that is stable to thermal processing treatment. A still further object of the invention is to provide a polyethylene-like material that is much clearer and has much better surface gloss than polyethylene per se. A further object is to provide a process for polymerizing monomeric mateial comprising ethylene, which process produces a polyethylene-like material that is the equivalent of the best commercial polyethylenes in most properties and in some properties is an improvement thereover, the process being effected at conditions normally leading to a netted cross-linked polyethylene unsuitable for commercial use. Further objects and advantages of the invention will be apparent to one skilled in the art from the accompanying disclosure and discussion.

The present invention provides new copolymers. These copolymers are the copolymers of ethylene with vinylene carbonate. Properties of vinylene carbonate and methods of preparing same are described by Newman and Addor, Jour. Amer. Chem. Soc. 75, 1263, March 5, 1953. Vinylene carbonate has the structural formula:

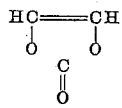

A suitable method of preparing vinylene carbonate is chlorination of ethylene carbonate to form monochloroethylene carbonate, followed by dehydrochlorination of the latter by reaction with an amine, resulting in vinylene carbonate.

The invention encompasses ethylene/vinylene carbonate copolymers containing ethylene and vinylene carbonate in all proportions. Most copolymers will contain from 5 to 99 weight percent ethylene and from 95 to 1 weight percent vinylene carbonate, based upon the combined weights of the monomers entering into the copolymer. In its broadest aspects the invention contemplates production of polymers of ethylene containing the smallest significant quantity of vinylene carbonate, which may be 1 weight percent or less, and at the other extreme the production of polymers of vinylene carbonate containing the smallest significant quantity of ethylene which may be 1 weight percent or less, and all proportions between those extremes.

Of particular interest are ethylene/vinylene carbonate copolymers containing a major proportion by weight of ethylene and a minor proportion by weight of vinylene carbonate combined in the copolymeric material. It is often preferred to prepare copolymers by polymerization of a monomeric material comprising ethylene and vinylene carbonate, containing a sufficiently high proportion of ethylene to produce a polyethylene-like material, i. e., a high molecular weight normally solid polymer having the general properties of polyethylene per se, i. e., polyethylene prepared from a monomeric material consisting of ethylene.

Any suitable combination of polymerization conditions resulting in the formation of a copolymer from a monomeric material comprising ethylene and vinylene carbonate can be employed in practicing the invention in its broadest aspects. However, in preferred embodiments a monomeric material comprising ethylene and vinylene carbonate is subjected to copolymerization at high pressures, preferably at least 5,000 pounds per square inch. Pressures of at least 15,000 pounds per square inch are more preferably employed, resulting in a product having high self-compatibility (homogeneity). Often optimum results are obtained at pressures within the range of 20,000 to 40,000 pounds per square inch. There is no particular upper pressure limit except that imposed by equipment limitations and pressures up to 200,000 pounds per square inch and even higher are suitable. It will be understood that suitable precautions should be observed in effecting this polymerization process, including the use of rupture discs, barriers, and other well-known means for carrying out high pressure reactions with safety. It is possible to have a combination of reaction conditions resulting in an explosive reaction, and this should be guarded against by known means. However, technical facilties for the commercial use of high pressures have been adequately developed, and therefore the high pressures employed in this embodiment of the present invention are no barriers to the commercial use of the high pressure copolymerization process.

The following discussion is directed particularly to preferred processes of the invention, wherein high pressures are employed to effect the copolymerization of ethylene with vinylene carbonate. However, the invention in its broadest aspects encompasses the use of any polymerization procedure to effect the copolymerization of ethylene with vinylene carbonate, and copolymers so produced.

The copolymerization can be carried out at temperatures within a fairly broad range, which is preferably 35° C. to 125° C. The higher temperatures tend to result in a discolored product, probably by decomposition of vinylene carbonate and/or vinylene carbonate units in the polymer molecules. However, in equipment and at conditions adapted for obtaining rapid copolymerization and satisfactory heat removal, tolerance towards high temperatures is considerably improved. In any event, a temperature sufficiently high within the operative range should be used to give a reasonable reaction rate. The preferred range is 50° C. to 100° C. It is an advantage of this invention that such moderate temperatures can be used and yet polymers are produced that are readily processible, as opposed to the unduly tough and grainy cross-linked and netted polymers made from ethylene at conditions identical except for the absence of vinylene carbonate.

In making a product which is similar to polyethylene but with some properties improved, proportions of vinylene carbonate within the range of from 1 to 30 weight percent of the total monomeric material charged to the polymerization are ordinarily preferred. Most frequently in preparing polyethylene-like products, vinylene carbonate makes up not over 20 weight percent of the monomeric material.

The invention in its broadest aspects is not departed from by providing, in addition to ethylene and vinylene carbonate, other monomeric materials capable of entering into the polymerization reaction. Thus, vinyl chloride, vinyl acetate, vinyl fluoride, propylene, styrene, acrylonitrile, and other unsaturated organic compounds can be used. This, of course, will affect the polymer properties but the amount can be chosen so as to retain the advantageous results of the copolymerization of vinylene carbonate with ethylene.

Under some conditions ethylene may be copolymerized with vinylene carbonate without the use of an added catalyst. However, it is preferred to employ a catalyst in an amount sufficient to give a reasonable reaction rate. Suitable catalysts are of the free-radical promoting type, principal among which are peroxide-type polymerization catalysts, and azo-type polymerization catalysts. Those skilled in the art are now fully familiar with a large number of peroxide-type polymerization catalysts and a suitable one can be chosen readily by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example, suitable peroxide-type catalysts include benzoyl peroxide, tertiary butyl peroxide, tertiary butyl hydroperoxide, diacetyl peroxide, diethyl peroxycarbonate, dimethylphenyl hydroperoxymethane (also known as cumene hydroperoxide), among the organic peroxides; hydrogen peroxide, potassium persulfate, perborates and other "per" compounds among the inorganic peroxides. The azo-type polymerization catalysts are also well-known to those skilled in the art. These are characterized by the presence in the molecule of the group —N=N—; the dangling valences can be attached to a wide variety of organic radicals, at least one however preferably being attached to a tertiary carbon atom. By way of example of suitable azo-type catalysts can be mentioned $\alpha,\alpha'$-azodiisobutyronitrile, diazoaminobenzene, azobis-(diphenylmethane), and $\alpha,\alpha'$-azobis-$\alpha$, $\gamma$-dimethylvaleronitrile. The peroxy-type or azo-type polymerization catalyst is used in small but catalytic amounts, which are generally not in excess of 1 percent by weight based upon the monomeric mixture. A suitable quantity is often in the range of 0.001 to 0.5 percent by weight. It will, of course, be understood that one catalyst will not necessarily be the full equivalent of another in all respects.

The polymerization can be effected in the presence of small but catalytic amounts of molecular oxygen. While this can be supplied in the form of air or other gases containing molecular oxygen, it is preferred to use essentially pure oxygen. The quantity will usually be within the range of 10 to 200 parts oxygen per million parts monomeric material, on the weight basis.

The polymerization can also be effected under the influence of ionizing radiation of polymerizing intensity in accordance with the general procedures described and claimed in the copending application of William H. Yanko and John D. Calfee, Serial No. 318,098, filed October 31, 1952. Ionizing radiation that can be employed to effect polymerization at high pressures includes $\alpha$-radiation and $\beta$-radiation, but is preferably electromagnetic radiation of high frequency not deflected by electric or magnetic fields and of great penetrative value, e. g., gamma rays and X-rays. Gamma-radiation arising from a radioactive substance, for example, cobalt-60, tantalum-182, potassium-40, etc. is a convenient and preferred source.

Copolymers of ethylene and vinylene carbonate produced in accordance with the present invention are inclusive of modified polymeric products known as telomers, obtained by carrying out the copolymerization in the presence of materials which are non-polymerizable under the conditions employed but which combine with a plurality of units of the monomers. The products obtained by such a telomerization or chain-transfer reaction may be represented by the formula: $Y(A)_nZ$, wherein A is a divalent radical formed from a polymerizable mixture of ethylene and vinylene carbonate and containing at least one ethylene and at least one vinylene carbonate unit, $n$ is an integer of 2 to 50 or even higher, and Y and Z are fragments terminally attached to a chain of monomer units, which fragments together form a molecule of the non-polymerizable compounds such as halogenated compounds, e. g., carbon tetrachloride; acids, e. g., isobutyric acid and anhydride; esters, e. g. methyl propionate; acetals, e. g., dioxolane; mercaptans, bisulfites, alcohols, ethers, silicon halides, hydrogen chloride and similar compounds. In a similar manner, hydrogen can be employed in the copolymerization to give a modified copolymer of ethylene and vinylene carbonate. Such quantity of hydrogen is preferably small, for example, 0.5 weight percent of the monomeric material.

A reaction time chosen for a given copolymerization will depend, among other things, on the percentage conversion desired. While high conversions, approaching 100 percent of the monomers, are not impossible, it is ordinarily much more practical to limit the extent of conversion to a value appreciably less than 50 weight percent of the monomeric material charged, for example, from 10 to 30 percent conversion. Of course, any unconverted monomers are recovered from the final reaction mixture and recycled, with purification if necessary, to the polymerization, or utilized as charge stock to another polymerization. Those skilled in the art will, of course, appreciate that reaction time is one variable which is interdependent with other reaction variables, particularly pressure, catalyst, amount of catalyst, purity of monomers, proportions of the monomers, the presence or absence of added reaction media, and whether the reaction is a batch or a continuous one. In some instances it may be desired to employ a reaction time of several days, but ordinarily reaction time not in excess of about 24 hours is satisfactory. For batch reactions, reaction times of 1 to 20 hours are usually preferred. For continuous reactions, the reaction times are ordinarily much shorter, and they range in a continuous flow system from a few minutes up to a few hours, for example, from 1 minute to 5 hours.

The copolymerization of ethylene with vinylene carbonate can be effected in accordance with the present invention in reaction mixtures consisting solely of ethylene, vinylene carbonate, and any catalyst employed. However, the copolymerization can also be carried out in the presence of added reaction media, for example, gaseous or liquid carrying fluids, e. g., water, or organic liquids which may or may not have a solvent action on the polymeric product, e. g., acetone, benzene, xylene, cyclohexanone, hexane, dioxane, methyl ethyl ketone. The use of added non-reacting fluid reaction media is particularly useful in a continuous flow process. When water is used as an added reaction medium, it is permissible to employ additionally suspending and/or emulsifying agents in small amounts which aid in the suspension or actual emulsification of the monomers and copolymer product in the water. Whether or not such materials are used, vigorous agitation is useful, when employing water as a reaction medium, e. g., as by stirring in a batch reactor, or by use of turbulent flow conditions in a continuous flow polymerization. Liquid reaction media assist in controlling the reaction temperature, since the polymerization is highly exothermic. Suitable proportions of water are, for example, from 0.5 to 5 parts by weight per part of monomeric material. If a solvent or a non-solvent liquid organic reaction or carrying medium is to be used, ordinarily at least 1 part by weight, up to 5 or 10 parts, will be suitable. Adequate provision should be made for removing the exothermic heat of reaction and thus avoiding too severe a temperature build-up during the polymerization.

Under suitable conditions, vinylene carbonate monomer units in the polymeric material can undergo hydrolysis, resulting in the presence of units of the following type in the polymer:

The extent of hydrolysis may range from only a very small percentage of the vinylene carbonate units in the polymeric material up to essentially complete hydrolysis, depending upon the conditions of treatment. When the polymerization is effected in the presence of water, a limited amount of hydrolysis can be expected to occur, especially if the aqueous medium is acidic or alkaline. Simple polymerization in the presence of water does not appear to effect a great deal of hydrolysis of vinylene carbonate monomer or vinylene carbonate units in the polymer. Of course the longer the reaction time the more extensive the hydrolysis that can be expected to occur. It may often be desirable to obtain hydrolysis of vinylene carbonate units in the polymer. The presence of hydroxyl groups in the polymer provides points for further reaction with all sorts of reagents, and imparts water-sensitivity to the polymer. In fact, where the percentage of vinylene carbonate in the copolymer is sufficiently high a water-soluble polymer can be made by hydrolysis. The same methods of hydrolysis can be used on the copolymers described herein as are employed in hydrolyzing vinyl acetate polymers to form polyvinyl alcohols. Such methods are numerous and are well-known in the art.

Normally solid thermoplastic copolymers of vinylene carbonate with ethylene made in accordance with the present invention can be subjected to conventional injection molding and compression molding operations, can be cast as films from solvent by known techniques, solutions of the copolymer can be extruded into various forms including extrusion in the form of fibers or films into a non-solvent liquid or into a gas effecting evaporation of solvent, or can be extruded in various forms in the absence of any solvent. Some of the copolymers made in accordance with the invention are particularly valuable in making films by the inflated balloon technique. The polymer can be worked on mills alone or in admixture with other plastic materials in known manner. Plasticizers, modifiers, fillers, stabilizers, pigments and the like can be incorporated in copolymers made in accordance with this invention. It will be appreciated that the characteristics of the numerous copolymers made under varying polymerization conditions and with varying proportions of ethylene and vinylene carbonate will cover a wide range. Those skilled in the art, having had the benefit of the present disclosure, can choose suitable proportions of ethylene and vinylene carbonate, and suitable polymerization conditions, for producing polymers of desired characteristics. High molecular weight normally solid thermoplastic copolymers are preferred, especially those containing a major proportion of ethylene and having polyethylene-like characteristics. However, low molecular weight semi-solid or liquid copolymers, made by suitable procedures, for example, telomerization as described herein-above, are within the broad scope of the invention.

The following examples provide details of certain preferred embodiments of the invention. The data are to be taken as exemplary, and the invention in its broadest aspects is not limited to the particular conditions and proportions set forth therein.

EXAMPLE 1

The copolymerization of ethylene with vinylene carbonate was effected in a high pressure shaker reaction bomb. This bomb was provided with thermocouples to measure the reaction temperature, and was connected by high pressure tubing with a water reservoir, water being used to pressure and to control the pressure on the reaction mixture.

Into the bomb, surrounded by ice, was placed 0.15 gram $\alpha,\alpha'$-azodiisobutyronitrile as catalyst and 20 grams of vinylene carbonate. The bomb was closed, chilled in Dry Ice (solid $CO_2$), and thereafter evacuated while at Dry Ice temperature. The chilled evacuated bomb was then filled with pure ethylene (approximately 100 grams).

The thus-filled bomb was placed in the shaker and the temperature set on automatic control for 55° C. and maintained there for 1 hour while the bomb warmed up to control (shaker) temperature. Meanwhile, the bomb was pressured with water to 5,000 pounds per square inch, after which the connection to the water reservoir was closed. The pressure in the bomb leveled off when the bomb reached 55° C.; the temperature was then raised to 75° C. After 45 minutes, the pressure rose to 22,000 pounds per square inch, and then fell rapidly to 12,000 pounds per square inch, at which point the pressure began to level off. The bomb was vented of unreacted material. On opening the bomb it was found to contain 30 grams of a white, spongy copolymer of ethylene and vinylene carbonate.

Analysis of the recovered copolymer showed its oxygen content to be 6 weight percent, corresponding to 10.7 weight percent vinylene carbonate units in the copolymer.

Properties of the copolymer were determined by standard plastics testing techniques. In Table I below, the thus-obtained data are presented in tabular form, alongside typical data for one of the best commercial polyethylenes.

Certain test methods, such as density, solubility, etc. are obvious. Other methods used are as follows:

I. Copper bar thermal properties—
   A. Softening temperature, °C.
   B. Melting temperature, °C.

The test is performed on a copper bar which is heated at one end and cooled at the other, thus forming a surface whose temperature varies along the bar between these extremes. Thermometers are mounted in the bar at intervals to determine the temperature of the individual parts. Particles of the polymer to be tested are sprinkled in a thin layer along the bar. After ten minutes the following observations are made.

Softening point: This is determined by brushing the sample with a bristle of a paint brush. The lowest temperature at which the sample just begins to stick to the bar is taken as the softening point.

Melting point: The lowest temperature at which the particles begin to lose their shape is taken as the melting point.

II. Melt index value—
   A. Extrusion rate, milligrams/second
   B. Elastic memory, percent A steel cylindrical chamber is maintained at 190° C. A drilled orifice of 0.063 inch diameter and about 0.6 inch length is screwed into the bottom of the cylinder. A steel ram carrying a weight on the top is used to develop the extrusion pressure on the polymer. The sample to be tested is first mill rolled for five minutes and then diced in order to give a uniform product free from occlusion of gases. After loading the diced particles into the extrusion chamber and placing the ram thereon, five minutes are allowed for the polymer to reach temperature equilibrium with the chamber. The weight is then applied to the ram and extrusion begins. The extruding strand is cut at the orifice and a timer started, and the strand then cut a number of times. The cut strands are weighed and the extrusion rate reported as milligrams (mgs.) per second. The elastic memory determination involves the measurement, by a micrometer, of the diameter of the extruded strand at the end which is extruded first. The percentage recovery or memory is calculated as follows:

$$\text{Percentage recovery} = \frac{\text{Measured diameter} - \text{orifice diameter}}{\text{Orifice diameter}} \times 100$$

III. Parallel plate plastometer data—
   A. Viscosity, poises × 10⁻⁶
   B. Molecular weight (weight average)

The Tinius-Olsen parallel plate plastometer is used in this determination. Essentially it consists of a system whereby a constant force is applied to two parallel plates kept at constant temperature, between which plates a molded disc of the plastic being tested is placed. Changes in thickness of the sample are measured over time increments. The test measures the flow of the plastic material under applied stresses at elevated temperatures, giving a melt viscosity value, from which approximate weight average molecular weight can be calculated.

IV. Modulus characteristics (Clash-Berg)—
   A. Brittle temperature ($T_f$), °C.
   B. Rubber temperature ($T_{2000}$), °C.

This test is a measure of the stiffness of a plastic specimen as a function of temperature, measured by means of a torsional test. The test is essentially that described by Clash and Berg, Industrial and Engineering Chemistry, 34, 1218 (1942). The brittle temperature ($T_f$) is the temperature at which the stiffness modulus is 135,000 p. s. i. The rubber temperature ($T_{2000}$) is the temperature at which the stiffness modulus is 2000.

IX. Tensile properties—
   A. Strength to yield, p. s. i.
   B. Strength to break, p. s. i.
   C. Elongation to yield, percent
   D. Elongation to break, percent These tests are determined by the standard tests ASTM D638-46T, D412-41.

The comparative data are as follows:

*Table 1*

COMPARISON OF PHYSICAL PROPERTIES OF ETHYLENE/VINYLENE CARBONATE COPOLYMER WITH COMMERCIAL POLYETHYLENE

| Physical Property | Commercial Polyethylene | Ethylene/Vinylene Carbonate Copolymer |
|---|---|---|
| I. Copper Bar Thermal Properties: | | |
|   A. Softening Temp., °C | 102 | 105. |
|   B. Melting Temp., °C | 125 | 120. |
| II. Melt Index Value: | | |
|   A. Extrusion rate, mg./sec | 2–4 | 7.7. |
|   B. Elastic Memory, percent | 50–60 | 53. |
| III. Parallel Plate Plastometer Data: | | |
|   A. Viscosity, Poises × 10⁻⁶ | 0.5–1.5 | 0.52. |
|   B. Molecular Weight | 20,000 (ave.) | 19,000. |
| IV. Modulus Characteristics (Clash-Berg): | | |
|   A. Brittle Temp., $T_f$, °C | −32.0 | −23.8. |
|   B. Rubber Temp. $T_{2000}$, °C | 85.0 | 82.3. |
| V. Solution Viscosity: | | |
|   A. Specific Viscosity, 0.1% in Xylene at 210° F | 0.08 | 0.07. |
| VI. Solubility in Organic Solvents: | | |
|   A. Cold (25° C.) | Insoluble | Insoluble. |
|   B. Hot (80° C.) | Sol. in xylene, carbon tetrachloride. | Sol. in xylene, carbon tetrachloride. |
| VII. Density: | | |
|   A. Density at 25° C., g./cc | 0.917 | 0.959. |
| VIII. Clarity: | | |
|   A. Visual inspection of molding | Very hazy and opaque. | Slightly hazy. |
| IX. Surface Gloss: | | |
|   A. Visual inspection of molding | Semi-dull and somewhat rough. | Glossy and smooth. |
| X. Tensile Properties: | | |
|   A. Strength to yield, p. s. i | 1,200–1,400 | 1,366. |
|   B. Strength to break, p. s. i | 1,800–2,000 | 2,229. |
|   C. Elongation to yield, percent | 50 | 80. |
|   D. Elongation to break, percent | 450–500 | 470. |

The foregoing data show that the copolymer is generally comparable to commercial polyethylene in most respects, with certain important improvements thereover. Ethylene/vinylene carbonate copolymer is much clearer than polyethylene. It has a better surface gloss. Additionally, the ethylene/vinylene carbonate copolymer was very stable to processing treatment, i. e., showed no signs of thermal decomposition. The milled material had good flow, as measured by extrusion rate, and had a low elastic memory. Elastic memory is in the same range as that of the particular commercial polyethylene described in Table I and this value is much lower than that for some commercial polyethylene. A low elastic memory is of course desirable in the end use of polymer, particularly extrusion. As to tensile properties, the percent elongation to yield was better than the commercial polyethylene, as was the strength to break.

It will be noted that the foregoing comparison was made on the basis of commercial polyethylene. An important aspect of the invention is brought out by consideration of the fact that polymerization of ethylene alone under the same reaction conditions used for the production of the ethylene/vinylene carbonate copolymer of this example results in a netted cross-linked polyethylene product that cannot be processed in commercial equipment customarily used for processing polyethylene.

EXAMPLE 2

In the high pressure polymerization apparatus described in Example 1, vinylene carbonate and ethylene were copolymerized in the manner described in Example 1. The iced bomb was charged with 20 grams vinylene carbonate and 0.15 gram of α,α'-azodiisobutyronitrile catalyst. The bomb was closed, cooled in Dry Ice, and evacuated, and then filled with pure ethylene (approximately 100 grams).

The charged bomb was placed in a shaker and pressured to 5,000 pounds per square inch immediately. When the temperature reached 50° C., the pressure leveled off at approximately 15,000 pounds per square inch. The pressure was then set at 20,000 pounds per square inch on automatic control for 17 hours.

The bomb was then discharged, and 6 grams of a somewhat yellow ethylene/vinylene carbonate copolymer was recovered.

This application is related to our copending application, Serial No. 550,827, filed December 5, 1955, wherein vinylene carbonate is copolymerized with a halo-substituted ethylene, said halo-substituted ethylene being an essential component of the monomeric mixture and resulting copolymer. It is also related to our copending application, Serial No. 550,828, filed December 5, 1955, wherein vinylene carbonate is homopolymerized or is copolymerized with an unsaturated organic compound copolymerizable therewith and having at least three carbon atoms in the molecule, at a pressure of at least 5,000 pounds per square inch. Said applications Serial No. 550,827 and Serial No. 550,828 are continuations-in-part of our now-abandoned copending application, Serial No. 355,860, filed May 18, 1953.

While the invention has been described with particular reference to various preferred embodiments thereof, it will be appreciated that variations from the details given herein can be effected without departing from the invention in its broadest aspects.

We claim:

1. A process which comprises subjecting a monomeric material consisting of a major proportion by weight of ethylene and a minor proportion by weight of vinylene carbonate to copolymerization at a pressure of at least 15,000 pounds per squire inch and a temperature within the range of 50° C. to 100° C.

2. A process which comprises subjecting a monomeric material comprising from 95 to 70 parts by weight ethylene and from 5 to 30 parts by weight vinylene carbonate to copolymerization at a pressure of at least 5,000 pounds per square inch and a temperature within the range of 35° C. to 125° C.

3. A process which comprises subjecting a monomeric material comprising a major proportion by weight of ethylene and a minor proportion by weight of vinylene carbonate to copolymerization at a pressure of at least 5,000 pounds per square inch and a temperature within the range of 35° C. to 125° C.

4. A normally solid polyethylene-like ethylene/vinylene carbonate copolymer having good surface gloss and clarity when molded and obtained by the process of claim 3 wherein the monomeric material contains at least 70 parts by weight ethylene and not over 30 parts by weight vinylene carbonate.

5. A copolymer according to claim 4 having at least a portion of the vinylene carbonate units therein hydrolyzed.

References Cited in the file of this patent

UNITED STATES PATENTS

| | | |
|---|---|---|
| 2,200,429 | Perrin et al. | May 14, 1940 |
| 2,563,771 | Adelson | Aug. 7, 1951 |
| 2,722,525 | Price et al. | Nov. 1, 1955 |

OTHER REFERENCES

Newman et al.: Jour. American Chem. Soc., vol. 75, March 5, 1953, pp. 1263 and 1264.